UNITED STATES PATENT OFFICE.

CAMPBELL C. CARPENTER, OF NIAGARA FALLS, NEW YORK, ASSIGNOR TO U. S. LIGHT & HEAT CORPORATION, OF NIAGARA FALLS, NEW YORK, A CORPORATION OF NEW YORK.

STORAGE-BATTERY SEPARATOR.

1,380,354.  Specification of Letters Patent.  Patented June 7, 1921.

No Drawing.  Application filed July 19, 1919. Serial No. 312,073.

*To all whom it may concern:*

Be it known that I, CAMPBELL C. CARPENTER, a citizen of the United States, residing at Niagara Falls, in the county of Niagara and State of New York, have invented new and useful Improvements in Storage-Battery Separators, of which the following is a specification.

The present invention relates to storage battery separators.

More particularly the present invention relates to methods of treating wood to prepare same for use as storage battery separators.

An object of the present invention is to provide a method of preparing wood which will result in tough, sturdy separators.

A further object is to provide an improved method of treating wood which will result in a porous separator permitting circulation of electrolyte in a storage battery cell.

A further object is to provide a method which will result in the removal of objectionable constituents of the wood, as for instance, gums and tarry matters.

Further objects will appear as the description proceeds.

According to the present invention, sheets of wood cut into approximately the size required for separators are subjected to a process of fermentation. For this purpose an aqueous solution of sugar and yeast may be used; or the wood may first be subjected to a treatment in a sugar solution, after which the yeast may be added; or the treatment in the sugar solution may be omitted, the wood being treated directly with those yeasts which have the power of acting upon cellulose substances directly, such for instance, as cellase.

The process of fermentation will, probably on account of the intimate association of the resulting alcohol with the objectionable substances in the wood, result in the practical removal of said objectionable matters or the transition thereof into innocuous substances. Furthermore, said process will expand the pores of the wood, producing porosity.

After the fermentation process, the alcohol and other products of fermentation should be removed, which may be done by distillation with steam or by drying under centrifugal action, or the separators may be subjected for a very short period of time to heat sufficient to instantaneously volatilize the alcohol.

The method described above is cheap and results in tough separators having the desired porosity and practical freedom from objectionable substances.

One embodiment of the present invention has been described in detail. Many modifications will occur to those skilled in the art. It is intended that the patent shall cover all such modifications that come within the scope of the invention as defined by the appended claims.

What I claim as new and desire to secure by Letters Patent of the United States, is—

1. The method of preparing storage battery separators which consists in treating wood by a process of fermentation.

2. The method of preparing storage battery separators which consists of treating wood with a fermentable substance and a fermentation agent.

3. The method of preparing storage battery separators which consists of treating wood with a fermentation agent which will directly attack cellulose.

In witness whereof I have hereunto subscribed my name.

CAMPBELL C. CARPENTER.